United States Patent Office 3,598,792
Patented Aug. 10, 1971

3,598,792
POLYMERS FROM DIESTERS OF N-ACRYLYLIMINODIACETIC ACIDS
Donald E. Jefferson, Sykesville, and Nelson S. Marans, Silver Spring, Md., assignors to W. R. Grace & Co., New York, N.Y.
No Drawing. Filed Nov. 19, 1969, Ser. No. 878,264
Int. Cl. C08f 1/16, 3/50, 15/16
U.S. Cl. 260—78.4
20 Claims

ABSTRACT OF THE DISCLOSURE

Polymers and copolymers of diesters of N-acrylyliminodiacetic acids are prepared by irradiating such diesters or mixtures thereof with methyl acrylate, methyl methacrylate, a vinylpyridine, N-vinylpyrrolidone, styrene, acrylonitrile, or vinyl acetate.

These polymers and copolymers are also prepared by treating such diesters or mixtures thereof with methyl acrylate, methyl methacrylate, a vinylpyridine, N-vinylpyrrolidone, styrene, acrylonitrile, or vinyl acetate with a free radical initiator.

These polymers can be hydrolyzed (or saponified and acidified) to convert them from the ester form to the carboxylic form.

BACKGROUND OF THE INVENTION

This invention is in the field of: (a) first polymers of diesters having the formula

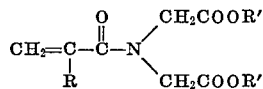

where R is H or lower alkyl and R' is lower alkyl; (b) first copolymers of such diesters with methyl acrylate, methyl methacrylate, a vinylpyridine, N-vinylpyrrolidone, styrene, acrylonitrile, or vinyl acetate; and (c) second polymers and second copolymers prepared by saponifying the ester groups (or a portion of such groups) of such first polymer or such first copolymer and acidifying the saponification product to form a second polymer or second copolymer in which the ester groups (or a portion of such groups) have been replaced by carboxyl groups.

The polymers and copolymers of this invention are useful as water treatment agents (boiler descalants, coagulants and chelants) and antistats in their hydrolyzed (acid) form and as adhesion and dye receptive polymer additives and antistats in their unhydrolyzed (diester) form.

SUMMARY OF THE INVENTION

In summary, this invention is directed to a poly(N-acrylyliminodiacetate diester) having about 10–10,000 repeating monomeric units of the structure

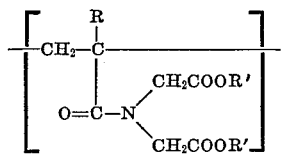

where R is H or lower alkyl and R' is lower alkyl (i.e., an alkyl group having about 1–7 carbon atoms).

DESCRIPTION OF THE PREFERRED EMBODIMENTS

In a preferred embodiment this invention is directed to a process for preparing the polymer described in the above summary comprising irradiating a monomeric diester having the formula

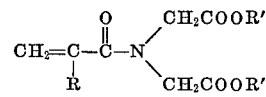

where R is H or lower alkyl and R' is lower alkyl (i.e., an alkyl group having about 1–7 carbon atoms), while maintaining the temperature thereof within the range of about 0–100° C. (preferably about 20–80° C.), in an inert atmosphere with about 0.1–10 megarads (preferably about 0.5–5 megarads) of high energy ionizing radiation (e.g., a high energy electron beam), maintaining the irradiated diester at about 30–100° C. (preferably about 45–75° C.) for about 10–300 minutes (preferably 60–150 minutes), and recovering the resulting polymer. In an alternative and substantially fully equivalent procedure the radiation (preferably using a total dose of about 0.01–10 megarads, more preferably about 0.1–5.0 megarads) can be conducted over a period of about 10–600 minutes while maintaining the monomer at an elevated temperature e.g., about 30–120° C. (preferably about 50–100° C.). When this alternative procedure is used polymerization of the diester occurs during the irradiation and the subsequent step of maintaining the irradiated diester at about 30–100° C. can be eliminated.

In another preferred embodiment ("Embodiment A") of this invention the polymer described in the above summary is prepared by a process comprising admixing an effective amount of a free radical initiator and a monomeric diester having the formula

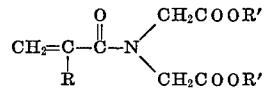

where R is H or lower alkyl and R' is lower alkyl and maintaining the temperature of the resulting mixture within a range at which the free radical initiator will form free radicals to polymerize the diester, and recovering the resulting polymer. (Such polymerization is conducted in an inert atmosphere, i.e., in the substantial absence of oxygen.)

In especially preferred embodiments of the process described in Embodiment A, supra:

(1) The free radical initiator is a member selected from the group consisting of; (a) a mixture of an alkali metal persulfate and an alkali metal bisulfite; (b) a mixture of an alkali metal persulfate and an alkanol (e.g., isopropyl alcohol, a butyl alcohol, a lower alkanol, or the like); (c) an acyl peroxide; (d) an aroyl peroxide; (e) a diazo compound (e.g., diazobisisobutyronitrile); and (f) a mixture of a hydroperoxide and a salt of a metallic ion in a reduced state (e.g., t-butyl hydroperoxide and iron (II) sulfate) or other reducing agent such as $NaHSO_3$ and the like; (g) a ceric ion-alcohol couple; and the like. (Because of the disclosure presented in this specification numerous other equivalent free radical initiators and free radical initiating systems will be readily apparent to those skilled in the art.);

(2) The mole ratio of free radical initiator to diester is about 1:100–10,000 (preferably about 1:200–5000);

(3) The resulting mixture is maintained at about 50–150° C. (preferably about 55–100° C.) for about 5–400 minutes (preferably about 30–200 minutes); and (4) An alkanol having about 1–10 carbon atoms per molecule is admixed with the diester and free radical initiator to promote solubility of the diester in the aqueous phase when an aqueous system is used for the polymerization and to promote the solubility of the resulting polymer to insure polymer growth to a desired or preselected molecular weight range. The alkanol may also serve as a reducing agent in a redox couple to produce free radicals.

In another preferred embodiment ("Embodiment B") this invention is directed to a poly(N-acrylyliminodiacetic acid) having about 10–10,000 repeating monomeric units per molecule; the structure of said units being

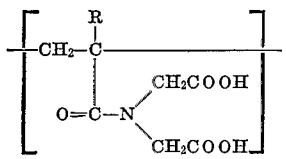

where R is H or lower alkyl.

In another preferred embodiment ("Embodiment C") the polymer described in Embodiment B, supra, is prepared by a process comprising maintaining a first mixture at about 35–100° C. for about 5–200 minutes, said first mixture comprising water and a poly(N-acrylyliminodiacetate diester) having about 10–10,000 repeating units per molecule, the units having the structure

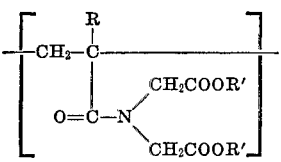

where R is H or lower alkyl and R′ is lower alkyl, said first mixture having a pH of about 7.1–10, the weight ratio of water to said poly(N-acrylyliminodiacetate diester) in the first mixture being about 1:0.1–10 (preferably about 1:0.3–5) to hydrolyze —COOR′ groups of said poly(N-acrylyliminodiacetate diester) to form a second mixture comprising water and the resulting hydrolyzed poly(N-acrylyliminodiacetate). The pH of the second mixture is then adjusted downward (if necessary) to about 2–6.8 to form a polymer consisting of about 10–10,000 repeating units per molecule, the units having the formula

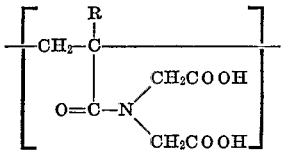

Since the pH decreases during the aforesaid hydrolysis, it is not always necessary to adjust it (the pH) downward subsequent to the hydrolysis. For example, a hydrolysis started at about pH 7.1 can result in a hydrolyzed mixture having a pH of about 6.8 or lower (e.g., ca. 4). The thus formed poly(N-acrylyliminodiacetic acid) is then separated (e.g., by centrifugation, decantation, or filtration) and recovered.

In another preferred embodiment ("Embodiment D") this invention is directed to a copolymer consisting of about 10–10,000 repeating units per molecule, said units having the structure

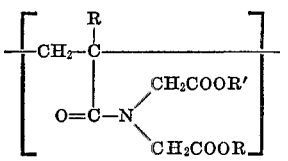

and

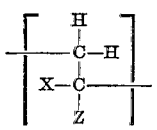

where; (a) R is a hydrogen or lower alkyl; (b) R′ is lower alkyl, (c) X is hydrogen or methyl; and (d) Z is $C_6H_5$— (phenyl),

(carboxyl),

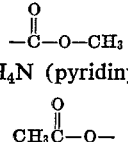

(methyl ester), —$C_5H_4N$ (pyridinyl), —CN (nitrile),

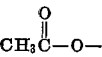

(acetate), or $C_4H_6ON$— (pyrrolidonyl), the unit ratio of

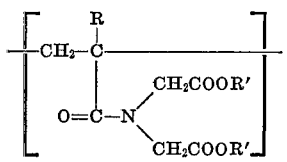

to

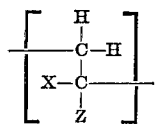

being about 1:0.1–10 (preferably about 1:0.2–5).

In another preferred embodiment ("Embodiment E") the copolymer of Embodiment D, supra, is prepared by a process comprising irradiating in an inert atmosphere with about 0.1–10 megarads (preferably about 0.5–5 megarads) of high energy ionizing radiation a mixture of monomers consisting essentially of a monomeric diester having the formula

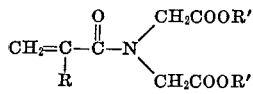

where R is H or lower alkyl and R′ is lower alkyl and a monomer selected from the group consisting of acrylic acid, methyl acrylate, methyl methacrylate, a vinylpyridine, N-vinylpyrrolidone, styrene, acrylonitrile, and vinyl acetate, the mole ratio of said monomeric diester to said group member being about 1:0.1–10 (preferably about 1:0.2–5), while maintaining the temperature of the mixture with a range of about 0–100° C. (preferably about 20–80° C.), maintaining the irradiated mixture of monomers at about 30–100° C. (preferably about 45–75° C.) for about 10–300 minutes (preferably about 60–150 minutes), and recovering the resulting copolymer.

In an alternative and substantially fully equivalent procedure the radiation (preferably using a total dose of about 0.01–10 megarads, more preferably about 0.1–5.0 megarads) can be conducted over a period of about 10–600 minutes while maintaining the mixture of monomers at an elevated temperature e.g., about 30–120° C. (preferably about 50–100° C.). When this alternative procedure is used polymerization of the diester occurs during the irradiation, and the subsequent step of maintaining the irradiated mixture at about 30–100° C. can be eliminated.

In another preferred embodiment ("Embodiment F") the copolymer of Embodiment D, supra, is prepared by a process comprising admixing an effective amount of a free radical initiator essentially of a diester having the formula

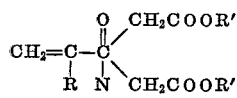

where R is H or lower alkyl and R′ is lower alkyl and a monomer selected from the group consisting of acrylic acid, methyl acrylate, methyl methacrylate, a vinylpyridine, N-vinylpyrrolidone, styrene, acrylonitrile, and vinyl acetate, the mole ratio of the diester to the group member being about 1:0.1–10 (preferably about 1:0.2–5.0), to form a second mixture, maintaining the temperature of the second mixture within a range at which the initiator will form free radicals for about 10–400 minutes (preferably about 30–200 minutes) to form said copolymer, and recovering said copolymer—said polymerization being conducted in an inert atmosphere—i.e., in the substantial absence of oxygen.

In especially preferred embodiments of the process set forth in Embodiment F, supra:

(1) The free radical initiator is a member selected from the group consisting of; (a) a mixture of an alkali metal persulfate and an alkali metal bisulfite; (b) a mixture of an alkali metal persulfate and an alkanol (e.g., isopropyl alcohol, a butyl alcohol, a lower alkanol, or the like); (c) an acyl peroxide; (d) an aroyl peroxide; (e) a diazo compound (e.g., diazobisisobutyronitrile); and (f) a mixture of a hydroperoxide and a salt of a metallic ion in a reduced state (e.g., t-butyl hydroperoxide and iron (II) sulfate) or other reducing agent such as $NaHSO_3$ and the like; (g) a ceric ion-alcohol couple; and the like. (Because of the disclosure presented in this specification numerous other equivalent free radical initiators and free radical initiating systems will be readily apparent to those skilled in the art.);

(2) The second mixture is maintained at about 50–150° C. (preferably about 55–100° C.) for about 5–400 minutes (preferably about 30–200 minutes);

(3) The mole ratio of free radical initiator to monomeric diester is about 1:100–10,000 (preferably about 1:200–5000); and (4) An alkanol having about 1–10 carbon atoms per molecule is admixed with the resulting mixture of diester, group member, and free radical initiator to promote solubility of the diester in the aqueous phase when an aqueous system is used for the polymerization and to promote the solubility of the final polymer to insure polymer growth to a desired or preselected molecular weight range. The alkanol may also serve as a reducing agent in a redox couple to produce free radicals.

In another preferred embodiment ("Embodiment G") this invention is directed to a copolymer consisting of about 10–10,000 repeating units per molecule, said units having the structures

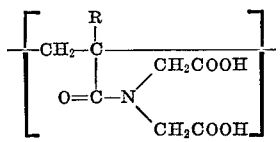

and

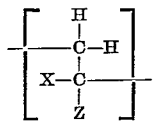

where; (a) R is a hydrogen or lower alkyl; (b) X is hydrogen or methyl; and (c) Z is $C_6H_5$—(phenyl),

(carboxyl), —$C_5H_4N$ (pyridinyl), —CN (nitrile),

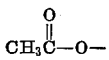

(acetate), or $C_4H_6ON$— (pyrrolidonyl), the unit ratio of

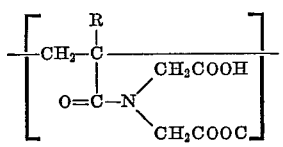

to

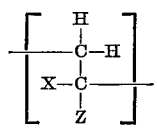

being about 1:0.1–10 (preferably about 1:0.2–5).

In another preferred embodiment ("Embodiment H") a first copolymer (the copolymer of Embodiment H, supra) is prepared by a process comprising;

(a) Preparing a first mixture of a second copolymer (the copolymer of Embodiment D, supra), an alkali, and water, the weight ratio of water to the second copolymer is about 1:0.1–10 (preferably about 1:3–5), and having a pH of about 7.1–10;

(c) Maintaining said first mixture at about 35-100° C. for about 5–200 minutes to saponify the ester groups (or part of such groups) present in said second copolymer;

(d) Adjusting the pH of the resulting mixture to about 2–6.8 to form said first copolymer; and (e) Recovering said first copolymer.

DETAILED DESCRIPTION OF THE INVENTION

As noted supra, the ester forms of the polymers and copolymers of this invention can be formed by the use of high energy ionizing radiation or by the use of free radical initiating substances to induce polymerization.

We have found that the radiation used to form the polymers and copolymers of this invention can be any high energy ionizing radiation such as high energy protons, electrons, neutrons, gamma rays, and X-rays which are emitted from radioactive isotopes or are generated by appropriate conventional apparatus. However, for convenience we prefer to use high energy electrons or gamma rays. Excellent results have been obtained with total radiation doses ranging from about 0.1–10 megarads. Higher total radiation doses have also produced excellent results; however, the results obtained do not justify the added expense involved where radiation doses higher than about 10 megarads are used.

Where conducting the polymerization with radiation we use an inert atmosphere over the monomer or mixture of monomers being subjected to irradiation. By an inert atmosphere we mean an atmosphere which is substantially free of oxygen. Such an atmosphere can be obtained by flushing air from the system with an inert (substantially oxygen free) gas such as argon, helium, nitrogen, or the like. Alternatively, an inert atmosphere can be provided by placing the material or materials to be irradiated in a container and evacuating the container until substantially all of the air has been removed therefrom. For such purposes a vacuum of about 0.01–100 mm. of mercury absolute has been found to give excellent results.

As noted supra, the monomers or mixture of monomers which are polymerized in the process of this invention can be polymerized by adding thereto a free radical initiating material. The following are useful as components for initiating free radicals in the process of this invention; peroxides such as benzoyl peroxide, 2,4-dichlorobenzoyl peroxide, methylethyl ketone peroxide, cyclohexanone peroxide, cumene hydroperoxide, tert-butyl hydroperoxide, lauroyl peroxide, ditert-butyl perphthalate, tert-butyl perbenzoate, caprylyl peroxide, hydroxyheptyl peroxide, ascaridole, bis(parabromobenzoyl) peroxide, bis(phthalyl) peroxide, bis(parachlorobenzoyl) peroxide, bis(succinyl) peroxide, acetylbenzoyl peroxide, bis(chloroacetyl) peroxide, bis(acetyl) peroxide, tertiary-butyl perbenzoate, tertiary-butyl hydroperoxide, bis(dichlorobenzoyl) peroxide, ozonides such as di-isopropylene ozonide and di-isobutylene ozonide, peracetic acid, perbenzoic acid, benzoyl peracetate, and peroxycarbonates such as ethyl peroxydicarbonate and the like; diazo compounds such as 2,2'-azobis(isobutyronitrile), 2,2' - azobis-(2-methylbutyronitrile), and 2,2'-azobis(methyl isobutyrate), and the like. A ceric ion-alkanol couple (i.e., ceric sulfate and a lower alkanol (an alkanol having about 1–7 carbon atoms)) can also be used with excellent results in the process of this invention. Other systems that can be used to initiate free radicals in the process of this invention include potassium peroxydisulfate-sodium bisulfite, hydrogen peroxide-ferrous ammonium sulfate, potassium peroxydisulfate-dodecyl mercaptan, and the like.

Where conducting the polymerization by irradiating a monomer or a mixture of monomers the resulting polymer or copolymer can be separated from any unreacted monomer by solvent extraction, by vacuum distillation, by solution and fractional precipitation, and similar techniques which are known to those skilled in the art.

Where conducting the polymerization with a free radical initiator the polymer or copolymer product can be separated from the reacted mixture in which it (the polymer or copolymer) was formed by solvent extraction, by vacuum distillation of monomer, by solution and fractional precipitation, and the like.

Where hydrolyzing ester groups present on a polymer or copolymer prepared by polymerizing a monomer or a mixture of monomers according to the process of this invention to obtain the acid form of such polymer or copolymer as final product the resulting final product can be separated from the reacted mixture in which it (the acid form of such polymer or copolymer was formed) by fractional separation with a solvent, or by chelating and solvating or precipitating the final polymer with metallic ions.

As noted supra, copolymers consisting of about 10–10,000 repeating units per molecule, said units having the structure

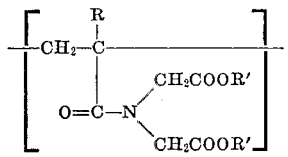

and

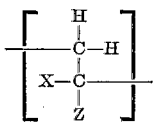

where; (a) R is a hydrogen or lower alkyl; (b) R' is lower alkyl; (c) X is hydrogen or methyl; and (d) Z is $C_6H_5$—, $$-\overset{O}{\underset{}{C}}-OH, \quad -\overset{O}{\underset{}{C}}-O-CH_3$$

—$C_5H_4N$, —CN, $$CH_3\overset{O}{\underset{}{C}}-O-$$

or $C_4H_6ON$—, the unit ratio of

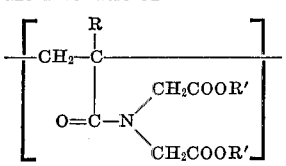

to

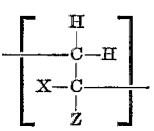

being about 1:0.1–10, by polymerizing a mixture of a monomer having the formula

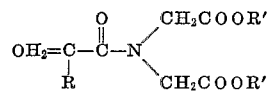

and a monomer selected from the group consisting of acrylic acid, methyl acrylate, methyl methacrylate, a vinylpyridine, N-vinyl-pyrrolidone, styrene, acrylonitrile, or vinyl acetate.

The following table (Table I) shows the structure of "X" and "Z" in the above copolymer where the monomer is as shown in said table.

TABLE I

| Monomer: | X | Z |
|---|---|---|
| Acrylic acid | —H | —COOH |
| Methyl acrylate | —H | —COOCH₃ |
| Methyl methacrylate | —CH₃ | —COOCH₃ |
| Vinylpyridine | —H | —C₅H₄N |
| N-vinylpyrrolidone | —H | C₄H₆ON— |
| Styrene | —H | —C₆H₅ |
| Acrylonitrile | —H | —CN |
| Vinyl acetate | —H | —COOCH₃ |

Our invention is further illustrated by the following specific examples:

EXAMPLE I

A solution of 0.25 mole (40.29 grams) of dimethyl-iminodiacetate in 200 ml. of diethyl ether (ether) was added dropwise to a solution of acrylyl chloride (0.125 mole, 11.31 grams) in 100 ml. of ether. The temperature of said solutions was adjusted to about 0–25° C. and the resulting product mixture was cooled as the dimethyl-iminodiacetate solution was added dropwise to maintain the temperature of said product mixture within the range of about 10–30° C.

A white crystalline precipitate formed immediately upon the addition of the acrylyl chloride. Said chloride was added over a period of about 30 minutes. The solid by-product (dimethyliminodiacetate hydrochloride) was filtered from the liquid phase of the product mixture, and said filtrate was concentrated under vacuum (i.e., volatile constituents were evaporated therefrom) to yield a solid material which was recovered. The solid material was crystallized from ether using conventional techniques. The crystallized solid (melting point, 60–61° C.) was recovered and analyzed. Said solid (which was labeled "Monomer No. 1") was identified by its infrared spectrum, by NMR (nuclear magnetic resonance), and by functional group analysis as the dimethyl ester of N-acryliminodiacetate. Conversion (1 pass yield) based on the weight of the recrystallized material was 56% theory.

EXAMPLE II

The general procedure of Example I was repeated. However, in this instance the acrylyl chloride was replaced with methacrylyl chloride using 0.125 mole (13.1 grams) in 100 ml. of diethyl ether. Also, in this instance after evaporating the diethyl ether, the residue (crude product) was purified by distilling under vacuum and collecting the fraction boiling between about 117 and 120° C. at 0.75 mm. of mercury absolute pressure. The distilled product (obtained in a conversion of 85% of theory and which was labeled "Monomer No. 2") was identified as the dimethyl ester of N-methacrylyliminodi-acetic acid by its infrared spectrum and by NMR (nuclear magnetic resonance).

Similar results have been obtained where using ethyl, propyl and other esters of iminodiacetic acid and where using substituted acrylyl halides having the formula

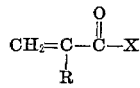

where X is Cl or Br and R is an ethyl or butyl or other lower alkyl group.

EXAMPLE III

A sample of Monomer No. 1 described in Example I was placed in a tube and evacuated to a pressure of about 0.3 mm. of mercury absolute. The tube was sealed while maintaining the vacuum therein. This sample was irradiated with high energy electrons from a 2 mev. Van de Graaff electron accelerator at 25° C. at a rate of 1 megarad per pass for 4 passes. No visual evidence of polymerization could be detected. The irradiated tube was then placed in a water bath at about 50–55° C. for about 2 hours. The tube was then opened and the material in it was removed. Upon examination and analysis it was found that substantially all of the monomer had polymerized to form a polymer consisting of about 200 repeating units having the formula

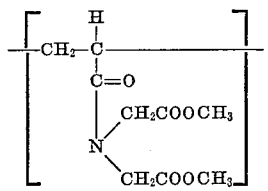

Substantially identical results were obtained with samples irradiated at 2 and 3 megarads per pass for 1 pass and for 4 passes, and aged at about 50–55° C. subsequent to irradiation.

Similar results, except that the methyl groups of the diester moiety of the polymer were replaced with other lower alkyl groups, were obtained when Monomer No. 1 was replaced with monomers having the formula

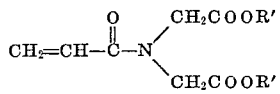

where R' was ethyl, n-propyl, isopropyl, n-butyl, isobutyl and other lower alkyl groups.

EXAMPLE IV

The general procedure of Example III, supra, was repeated. However, in this instance Monomer No. 1 was replaced with Monomer No. 2 (described in Example II, supra), and the monomer, in a sealed evacuated tube, was irradiated with high energy electrons at 2 megarads per pass for 5 passes. Subsequent to irradiation the tube was placed in a water bath at about 70° C. for about 100 minutes. At the end of this period the tube was removed from the bath, opened, and its contents recovered. Unreacted monomer was separated from the polymer product by vacuum distillation, and the product was recovered. Examination and analysis of the polymer product established that it was a polymer consisting of about 2,000 repeating units having the formula

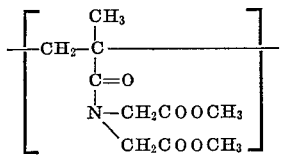

This polymer was labeled "Polymer A."

Similar results, except that the methyl groups of the diester moiety and the methacrylyl moiety of the polymer were replaced with other lower alkyl groups were obtained when Monomer No. 2 was replaced by monomers having the formula

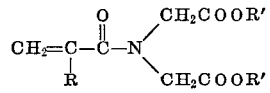

where R and R' were other lower alkyl groups such as n-propyl, isopropyl, n-hexyl, isohexyl, and the like including monomers in which R and R' were identical, and those in which R and R' were not identical.

EXAMPLE V

A 5 gram sample of Polymer A in particulate form, the particle size being about 0.5–2 mm., was maintained in an aqueous system having a temperature of about 40° C. and a pH of about 8 for about 30 minutes. Diluted (ca. 3 molar) sulfuric acid was then added to the system to bring the pH thereof to about 3. This treatment converted substantially all of the ester groups of the polymer to carboxyl groups and formed a polymer consisting of about 2,000 repeating units, said units having the formula

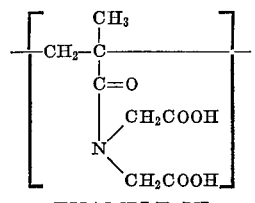

EXAMPLE VI

The general procedure of Example IV was repeated. However, in this instance the procedure was modified by using a mixture of monomers in place of Monomer No. 2 which had been used in Example IV. The mixture of monomers was a mixture of Monomer No. 2 and styrene in 1:1 mole ratio.

The results were substantially the same as those obtained in Example IV except that the product consisted of a copolymer of about 3,000 repeating units per polymer molecule, said units having the formulas

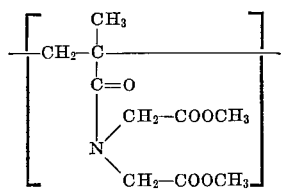

and

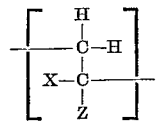

where X is —H and Z is

the unit ratio being 1:1. This polymer (copolymer) was labeled "Copolymer B."

Similar results (except for the structure of "X" and "Z") were obtained when the styrene was replaced by acrylic acid, methyl acrylate, methyl methacrylate, 2-vinylpyridine, 3-vinylpyridine, 4-vinylpyridine, N-vinylpyrrolidone, acrylonitrile, and vinyl acetate in which instances "X" and "Z" were as shown in Table I, supra.

EXAMPLE VII

The general procedure of Example V was repeated. However, in this instance the procedure was modified by replacing Polymer A with Copolymer B. The final product was a copolymer consisting of about 3,000 repeating units, said units having the formulas

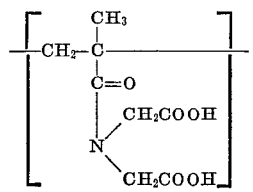

and

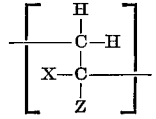

where X is —H and Z is

the unit ratio being 1:1.

Similar results with "X" and "Z" being as shown in Table I, supra, were obtained when Copolymer B was replaced with the other copolymers described in Example VI, supra.

EXAMPLE VIII

A 26.7 gram portion of N-acrylyldimethyliminodiacetate

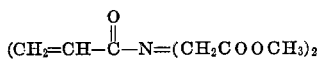

i.e., Monomer No. 1, was placed in a 2 neck, 500 ml., round bottom flask. About 83 grams of water was added, and the contents of the flask was heated to about 50° C. while flushing air from the flask with a stream of argon. Then, while still passing the flushing stream through the system and while stirring the material in the flask, about 0.02 gram of $K_2S_2O_8$ (potassium persulfate) and 1.5 grams of isopropyl alcohol were added to the flask. The temperature of the material within the flask rose to 65° C. and was maintained at about 65° C. for about an hour. A white solid formed in the flask. This solid was recovered. Examination and analysis of the solid established that it was a polymer having about 500 repeating units per molecule, the units having the formula

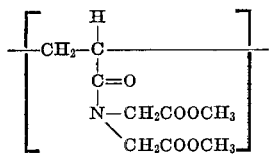

EXAMPLE IX

The general procedure of Example VIII was repeated. However, in this instance Monomer No. 1 was replaced with Monomer No. 2. Results of this run were substantially identical to those of Example VIII except that the polymer product consisted of about 1,000 repeating units per molecule, the units having the formula

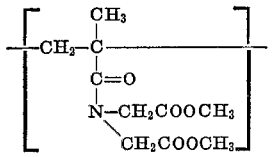

EXAMPLE X

The general procedure of Example VIII was repeated. However, in this instance Monomer No. 1 was replaced with a mixture of Monomer No. 1 and N-vinylpyrrolidone, the mole ratio of Monomer No. 1 to N-vinylpyrrolidone being about 1:2, the isopropyl alcohol was replaced with 0.15 gram of $FeSO_4 \cdot 7H_2O$ and the potassium persulfate was replaced by about 0.045 gram of tertiary-butyl hydroperoxide.

The product was a copolymer consisting of about 1,000 repeating units per molecule, said units having the formulas

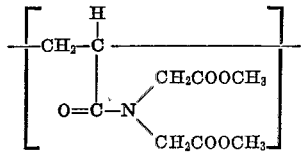

("Unit A")

and

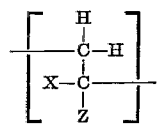

("Unit B")

where X is —H and Z is $C_4H_6ON$—, the unit ratio of said units being 1:2 (i.e., there were 2 Unit B's for each Unit A).

Similar results, except for the identities of "X" and "Z," were obtained when the N-vinylpyrrolidone was replaced with acrylic acid, methyl acrylate, methyl methacrylate, 2-, or 3-, or 4-vinylpyridine, styrene, acrylonitrile, and vinyl acetate in which instances "X" and "Z" were as shown in Table 1, supra.

In other runs, each of the above-listed free radical initiators was used with excellent results.

In still other runs excellent results were obtained in preparing polymers and copolymers by the free radical induced polymerization of diester monomers having the formula

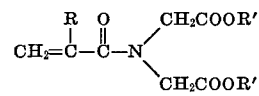

where R and R' are lower alkyl (other than methyl) such as ethyl, isopropyl, isoheptyl, n-hexyl, and the like were used. In some of these runs R and R' were identical and in other runs they were different. In some runs one of the aforesaid diester monomers was the sole monomer, and in still other runs said diester monomer was mixed with a monomer selected from those listed in Table 1, supra. Each of the monomers listed in said table was used in at least one run, and each of the above-mentioned diester monomers was used in at least one run with excellent results.

EXAMPLE XI

A 2.0 g. sample of the N-acrylyliminodiacetic acid dimethyl ester was sealed in a glass tube after evacuation at 0.3 mm. Hg pressure. The tube was placed in a thermostatically controlled bath at 80° C. in a $^{60}Co$ irradiation vault. The sample is irradiated for three hours at a dose rate of 0.04 megarads per hour. The polymer sample was completely polymerized at the end of this time period. The resulting polymer consisted of about 3,000 repeating units per molecule, said units having the formula

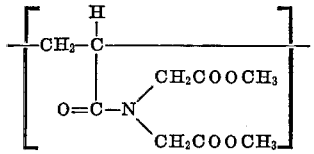

EXAMPLE XII

The general procedure of Example VIII was repeated. However, in this instance the water and isopropyl alcohol was omitted and the $K_2S_2O_8$ was replaced with an equivalent quantity of 2,2'-azobis(isobutyronitrile). After maintaining the thus perpared mixture at about 70° C. for about an hour the resulting reaction product was cooled to about 25° C. and extracted with two 20 ml. portions of isopropyl alcohol. An isopropyl alcohol insoluble residue remained. This residue was found to be a polymer consisting of about 150 repeating units per molecule, said repeating units having the formula

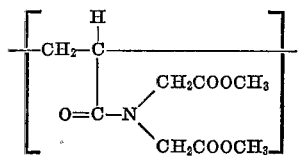

As used herein the term "mole" has its generally accepted meaning, i.e., that quantity of a substance containing substantially the same number of molecules as there are atoms in 12 grams of pure $^{12}C$.

We claim:

1. A poly(N-acrylyliminodiacetate diester) having about 10–10,000 repeating monomeeric units per molecule, said units having the structure

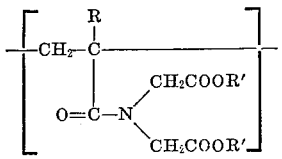

where R is H or lower alkyl and R' is lower alkyl.

2. A process for preparing the poly(N-acrylyliminodiacetate diester) of claim 1, comprising irradiating a monomeric diester having the formula

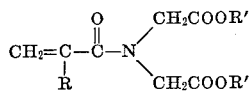

where R is H or lower alkyl and R' is lower alkyl, while maintaining the temperature thereof within the range of about 0–100° C., in an inert atmosphere, with about 0.1–10 megarads of high energy ionizing radiation, maintaining the irradiated diester at about 30–100° C. for about 10–300 minutes, and recovering the resulting polymer.

3. The process of claim 2 in which the high energy ionizing radiation is gamma rays.

4. A process for preparing the poly(N-acrylyliminodiacetate diester) of claim 1, comprising admixing in an inert atmosphere an effective amount of a free radical initiator and a monomeric diester having the formula

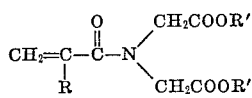

where R is H or lower alkyl and R' is lower alkyl and maintaining the resulting mixture in the inert atmosphere while maintaining the temperature of said resulting mixture within a range at which the free radical initiator will form free radicals to polymerize the diester, and recovering the resulting polymer.

5. The process of claim 4 in which the free radical initiator is a member selected from the group consisting of; (a) a mixture of an alkali metal persulfate and an alkali metal bisulfite; (b) a mixture of an alkali metal persulfate and an alkanol; (c) an acyl peroxide; (d) an aroyl peroxide; (e) a diazo compound; (f) a mixture of a hydroperoxide and a salt of a metallic ion in a reduced state; and (g) a ceric ion-alcohol couple.

6. The process of claim 4 in which the mole ratio of free radical initiator to diester is about 1:100–10,000.

7. The process of claim 4 in which the resulting mixture is maintained at about 50–150° C. for about 5–400 minutes.

8. The process of claim 5 in which an alkanol having about 1–10 carbon atoms per molecule is admixed with the diester and free radical initiator.

9. A poly(N-acrylyliminodiacetic acid) having about 10–10,000 repeating monomeric units per molecule, said units having the structure

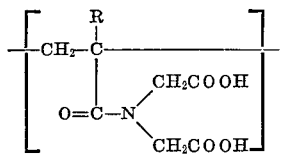

where R is H or lower alkyl.

10. A process for preparing the polymer of claim 9, comprising maintaining a first mixture of water and a poly(N-acrylyliminodiacetate diester) having about 10–10,000 repeating monomeric units per molecule, said units having the structure

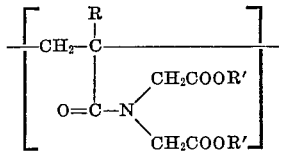

where R is H or lower alkyl and R' is lower alkyl, the weight ratio of water to poly(N-acrylyliminodiacetate diester) being about 1:0.0–10, the pH of the first mixture being about 7.1–10, at about 35–100° C. for about 5–200 minutes to hydrolyze the diester groups of the poly(N-acrylyliminodiacetate diester), adjusting the pH of the resulting second mixture to about 2–6.8 to form the poly(N-acrylyliminodiacetic acid), and recovering said poly(N-acrylyliminodiacetic acid).

11. A copolymer consisting of about 10–10,000 repeating units per molecule, said units having the structures

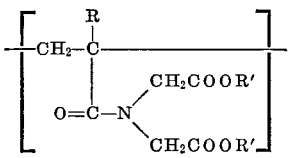

and

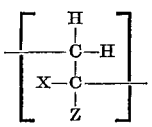

where; (a) R is a hydrogen or lower alkyl; (b) R' is lower alkyl; (c) X is hydrogen or methyl; and (d) Z is —$C_6H_5$,

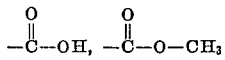

—$C_5H_4N$, $$-CN, \quad CH_3\overset{O}{\underset{\|}{C}}-O-$$

or $C_4H_6ON$—, the unit ratio of

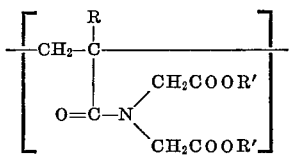

to

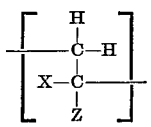

being about 1:0.1–10.

12. A process for preparing a copolymer of claim 11, comprising irradiating in an inert atmosphere with about 0.1–10 megarads of high energy ionizing radiation a mixture of monomers consisting essentially of a monomeric diester having the formula

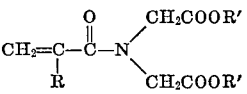

where R is H or lower alkyl and R' is lower alkyl and a monomer selected from the group consisting of acrylic acid, methyl acrylate, methyl methacrylate, a vinylpyridine, N-vinylpyrrolidone, styrene, acrylonitrile, and vinyl acetate, the mole ratio of said monomeric diester to said group member being about 1:0.1–10, while maintaining the temperature of the mixture within a range of about 0–100° C., maintaining the irradiated mixture at about 30–100° C. for about 10–300 minutes, and recovering the resulting copolymer.

13. A process for preparing a copolymer of claim 11, comprising admixing in an inert amtosphere an effective amount of a free radical initiator and a first mixture of monomers, said first mixture consisting essentially of a diester having the formula

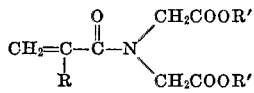

where R is H or lower alkyl and R' is lower alkyl and a monomer selected from the group consisting of acrylic acid, methyl acrylate, methylmethacrylate, a vinylpyridine, N-vinylpyrrolidone, styrene, acrylonitrile, and vinyl acetate, the mole ratio of the diester to the group member being about 1:0.1–10, to form a second mixture, maintaining said second mixture in an inert atmosphere while maintaining the temperature of said second mixture within a range at which the initiator will form free radicals for about 10–400 minutes to form said copolymer, and recovering said copolymer.

14. The process of claim 13 in which the free radical initiator is a member selected from the group consisting of; (a) a mixture of an alkali metal persulfate and an alkali metal bisulfite; (b) a mixture of an alkali metal persulfate and an alkanol; (c) an acyl peroxide; (d) an aroyl peroxide; (e) a diazo compound; (f) a mixture of a hydroperoxide and a salt of metallic ion in a reduced state; and (g) a ceric ion-alcohol couple.

15. The process of claim 13 in which the temperature is about 50–150° C.

16. The process of claim 13 in which the mole ratio of free radical initiator to monomeric diester is about 1:100–10,000.

17. A copolymer consisting of about 10–10,000 repeating units per molecule, said units having the structure

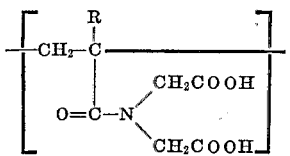

and

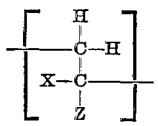

where; (a) R is a hydrogen or lower alkyl; (b) X is hydrogen or methyl; and (c) Z is $C_6H_5$—,

—$C_5H_4N$, —CN,

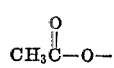

or $C_4H_6ON$—, the unit ratio of

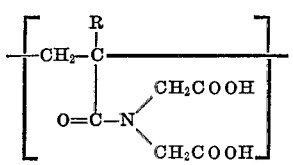

to

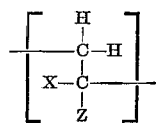

being about 1:0.1–10.

18. A process for preparing the copolymer of claim 17 comprising maintaining a first mixture of water and a copolymer consisting of about 10–10,000 repeating units per molecule, said units having the structures

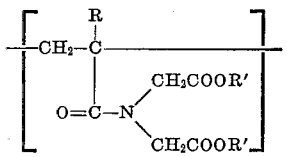

and

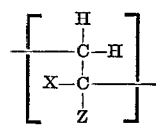

where; (a) R is hydrogen or lower alkyl; (b) R' is lower alkyl; (c) X is hydrogen or methyl; and (d) Z is $C_6H_5$—,

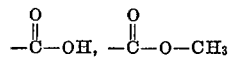

—$C_5H_4N$, —CN,

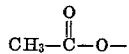

or $C_4H_6ON$—, the unit ratio of

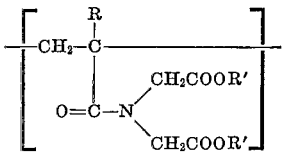

to

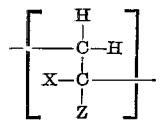

being about 1:0.1–10, the pH of the first mixture being about 7.1–10, at about 35–100° C. for about 5–200 minutes to saponify the diester groups of poly(N-acryliminodiacetate diester), adjusting the pH of the resulting second mixture to about 2–6.8 to form the copolymer of claim 17, and recovering the thus formed copolymer.

19. A process for preparing the poly(N-acryliminodiacetate diester) of claim 1 comprising irradiating in an inert atmosphere a monomeric diester having the formula

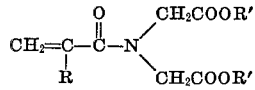

where R is H or lower alkyl and R' is lower alkyl with about 0.01–10.0 megarads of high energy ionizing radiation while maintaining the monomeric diester at about 30–120° C., the irradiation time being about 10–600 minutes, and recovering the resulting polymer.

20. A process for preparing the copolymer of claim 11 comprising irradiating in an inert atmosphere a mixture of monomers consisting essentially of a monomeric diester having the formula

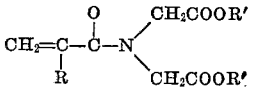

where R is H or lower alkyl and R' is lower alkyl and a monomer selected from the group consisting of acrylic acid, methyl acrylate, methyl methacrylate, a vinylpyridine, N-vinylpyrrolidone, styrene, acrylonitrile, and vinyl acetate, the mole ratio of said monomeric diester to said group member being about 1:0.1–10, with about 0.01–10.0 megarads of high energy ionizing radiation while maintaining the mixture of monomers at about 30–120° C., the irradiation time being about 10–600 minutes, and recovering the resulting copolymer.

References Cited

UNITED STATES PATENTS 3,395,134  7/1968  D'Alelio et al. _____ 260—89.5

JOSEPH L. SCHOFER, Primary Examiner

J. KIGHT III, Assistant Examiner

U.S. Cl. X.R.

204—159.22; 260—78.5